(12) United States Patent
Yoshizawa

(10) Patent No.: US 8,884,842 B2
(45) Date of Patent: Nov. 11, 2014

(54) PRESENTATION SYSTEM AND DISPLAY TERMINAL USED IN THE PRESENTATION SYSTEM

(75) Inventor: Hiroaki Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 94 days.

(21) Appl. No.: 13/493,159

(22) Filed: Jun. 11, 2012

(65) Prior Publication Data
US 2012/0313837 A1    Dec. 13, 2012

(30) Foreign Application Priority Data
Jun. 9, 2011    (JP) .................................. 2011-128916

(51) Int. Cl.
G09G 5/00    (2006.01)
G06F 3/14    (2006.01)

(52) U.S. Cl.
CPC ........................ G06F 3/14 (2013.01)
USPC .............. 345/1.2; 345/1.1; 345/1.3; 725/136; 725/105; 725/109

(58) Field of Classification Search
USPC ............................ 345/1–2; 725/136, 105, 109
See application file for complete search history.

(56) References Cited

U.S. PATENT DOCUMENTS

2003/0211856 A1* 11/2003 Zilliacus ....................... 455/466
2009/0094630 A1*  4/2009 Brown ............................ 725/12
2010/0218099 A1*  8/2010 van Melle et al. ............. 715/730

FOREIGN PATENT DOCUMENTS

JP    2001-100716 A    4/2001
JP    2002-351434 A    12/2002

* cited by examiner

*Primary Examiner* — Shaheda Abdin
(74) *Attorney, Agent, or Firm* — Holtz, Holtz, Goodman & Chick PC

(57) ABSTRACT

A presentation system comprising a presenter terminal and at least one audience terminal which is connected to the presenter terminal to communicate with each other;
  wherein the audience terminal comprises;
    an identification information transmitting section which transmits identification information of the audience terminal to the presenter terminal;
  wherein the presenter terminal comprises;
    a display section which displays an image used for a presentation;
    an identification information storing section which stores the identification information transmitted by the identification information transmitting section of the audience terminal in association with a displayed image displayed by the display section;
    an identification information display controlling section which controls the display section to display the identification information in association with information on the displayed image.

12 Claims, 8 Drawing Sheets

FIG. 3

QUESTION TABLE T10

| NUMBER OF SLIDE IMAGE | TOTAL NUMBER OF QUESTIONS |
|---|---|
| ② | 2 |
| ⑤ | 1 |
| ⑥ | 3 |
| ⑨ | 7 |
| ⑫ | 4 |

PRESENTATION SYSTEM AND DISPLAY TERMINAL USED IN THE PRESENTATION SYSTEM

CROSS-REFERENCE TO RELATED APPLICATIONS

This application is based upon and claims the benefit of priority from Japanese Patent Application No. 2011-128916, filed Jun. 9, 2011, the entire contents of which are incorporated herein by reference.

BACKGROUND OF THE INVENTION

1. Field of the Invention

The present invention relates to a presentation system and display terminal used in the presentation system.

2. Description of the Related Art

In recent years, a presentation is performed in various ways at the place where a presenter gives the presentation to audiences in a school or company.

For example, Japanese Patent Publication No. 2001-100716 discloses a presentation system that terminals, such as personal computers, are given in order to share the contents of the presentation to the audiences of each, and a presenter terminal transmits image data which used for the presentation to the each of terminals by making communication connection of the each of terminals and the presenter terminal.

In the presentation system described above, question-and-answer session is usually given after the presentation.

Indeed, the presenter has to find out slide image corresponding to the question among all slide images in response to the question from audience. That is why the presenter can not operate the question-and-answer session smoothly.

Japanese Patent Publication No. 2002-351434 discloses an invention which can solve the above problem. In this invention, simplified terminal which can transmit its own identification information to presenter terminal is distributed to each audience. When the presenter terminal receives the identification information, the presenter terminal stores the identification information in association with currently displayed slide image.

According to this invention, an audience let the audience terminal transmit the identification information to the presenter terminal during the presentation. Then the presenter can let the presenter terminal redisplay a slide image which had been displayed when the identification information had been transmitted.

However, the presenter can not figure out how many questions are coming about which slide image. In other words, the presenter becomes to figure out whole question status only question-and-answer session after the presentation. Therefore, the presenter can not make adaptable correspondence for which adjusts allocation of time in the question-and-answer session according to the number of questions or makes supplemental explanation for slide image having many questions. As a result, the process of the presentation including the question-and-answer session is delayed. The present invention has been made in view of the foregoing problems of conventional technology. It is accordingly an object of the present invention to provide a presentation system which can figure out a whole question status received from audience during the presentation and perform a proper question-and-answer session.

SUMMARY OF THE INVENTION

According to one aspect of the present invention, there is provided a presentation system comprising a presenter terminal and at least one audience terminal which is connected to the presenter terminal to communicate with each other; wherein the audience terminal comprises; an identification information transmitting section which transmits identification information of the audience terminal to the presenter terminal; wherein the presenter terminal comprises; a display section which displays an image used for a presentation; an identification information storing section which stores the identification information transmitted by the identification information transmitting section of the audience terminal in association with a displayed image displayed by the display section; an identification information display controlling section which controls the display section to display the identification information in association with information on the displayed image.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENT

Preferred embodiments of the present invention will now be described with reference to the drawings. In the embodiments described below, various technically preferred limits are set for carrying out the invention, but the scope of the invention is not limited to the following embodiments or examples shown in the drawings.

Using an example where the present invention is applied to a presentation system which comprises a presenter terminal which a presenter operates and an audience terminal which an audience operates so as to communicate each other by a wireless communication, the present invention will be described with reference to the drawings.

Figure 1:
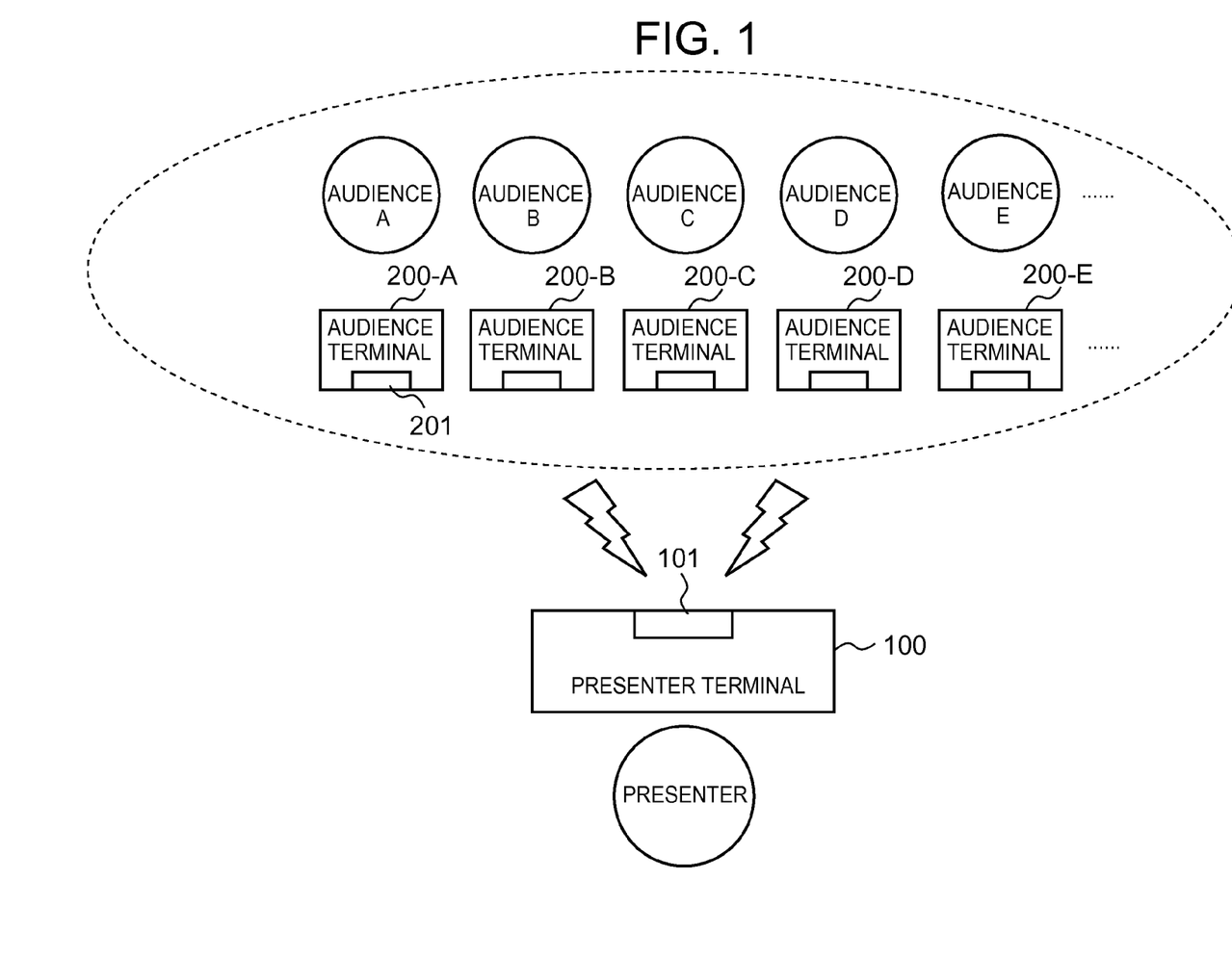
FIG. 1 is a conceptual diagram illustrating the overall configuration of a presentation system according to the embodiment.

FIG. 1 is a conceptual diagram illustrating the overall configuration of a presentation system according to the embodiment. The presentation system according to the embodiment comprises a presenter terminal 100 which is disposed at a place of a conference room or class room and plural audience terminal 200 (200-A, 200-B, 200-C, etc) which connect with the presenter terminal 100 so as to communicate each other by a wireless communication. The presenter terminal 100 is operated by a presenter. The each audience terminal 200 is given to each one of audiences and operated by them. Then, the presenter terminal 100 transmits a slide image which is used for the presentation to the each audience terminal 200. The each audience terminal 200 receives and displays the slide image in order to share the slide image.

As in shown FIG. 1, the presenter terminal 100 has a wireless communication section 101 which can communicate with other terminal. Also the audience terminal 200 has a wireless communication section 201.

Figure 2:
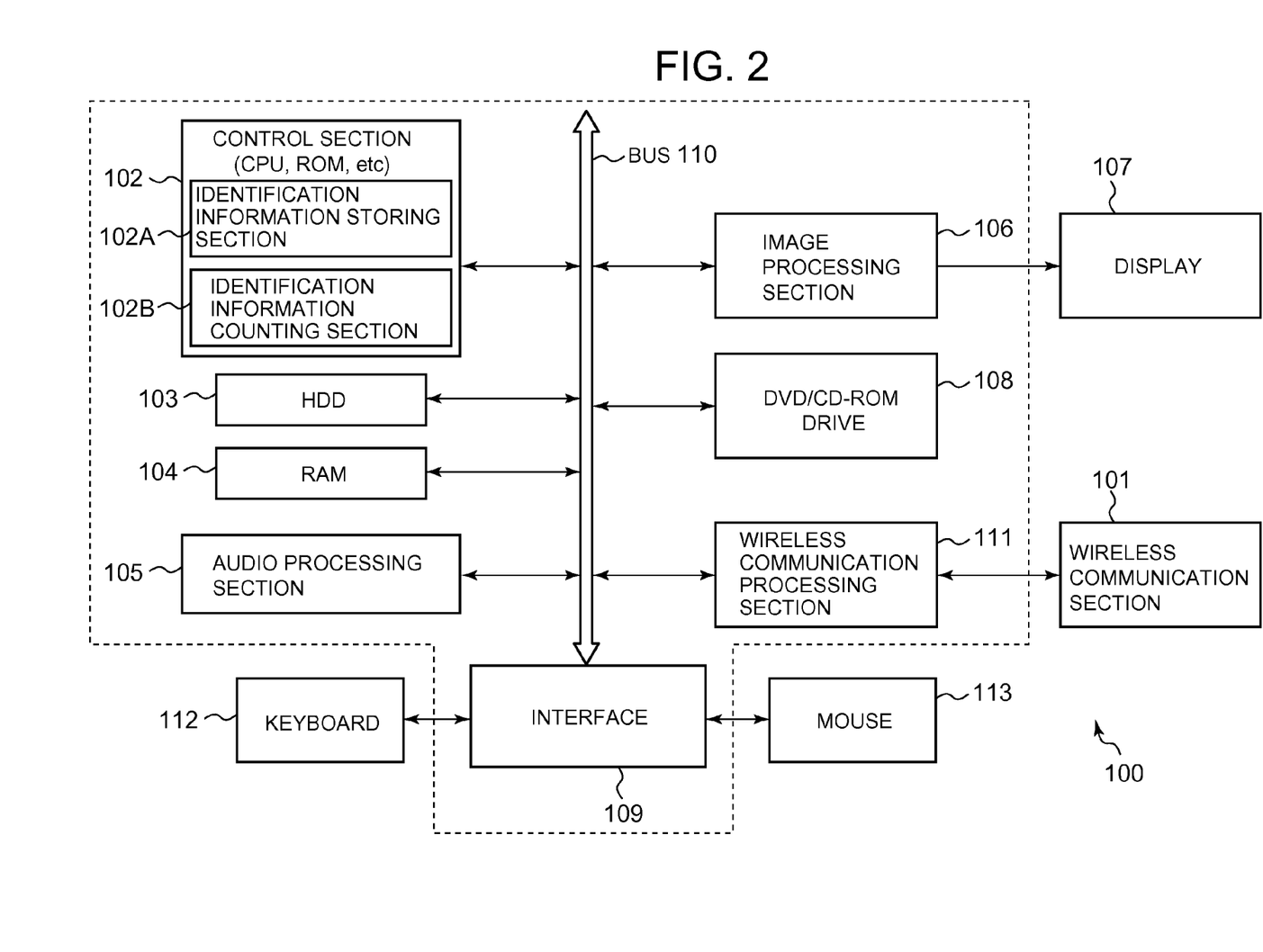
FIG. 2 is a block diagram illustrating the overall configuration of the function of a circuit provided for a presenter terminal 100 according to the embodiment.

FIG. 2 is a block diagram illustrating the overall configuration of the function of a circuit provided for the presenter terminal 100 according to the embodiment. As shown FIG. 2, the presentation terminal 100 comprises the wireless communication section 101, a control section 102, a HDD (Hard Disk) 103, a RAM (Random Access Memory) 104, an audio processing section 105, an image processing section 106, a display section 107, a DVD/CD-ROM drive 108 and an interface 109 via a bus 110. The wireless communication section 101 is connected to a wireless communication processing section 111. A wireless signal is received by the wireless communication section 101 and demodulated by the wireless communication processing section 111 and transmitted to the control section 102. And a wireless signal transmitted to the audience terminal 200 is demodulated by the wireless communication processing section 111 and transmitted from the wireless communication section 101.

Only Memory) and operates sequentially a program stored in the RAM 104 based on a basic program comprising a boot program or OS (Operating System) stored in the ROM. Indeed the control section 102 controls each section of the presenter terminal 100. And the control section 102 includes an identification information storing section 102A which stores an its own identification information of the audience terminal 200 transmitted from the audience terminal 200 in the RAM 104 in association with a currently displayed slide image. Furthermore the control section 102 includes an identification information counting section 102B which counts a number of the identification information stored by the identification information storing section 102A for the each slide image. The HDD (Hard Disk) 103 stores the slide image which is used for the presentation or an image obtained from external.

The RAM 104 is used as a main memory or working area and stores a program or data transmitted from the DVD-CD-ROM drive 108. And the RAM 104 stores a question table T10 including the number of the identification information counted by the identification information counting section 102B for the each slide image. This information is read in according to an instruction from the control section 102. The presenter can figure out how many questions are coming about which slide image by checking the question table T10 on a real-time basis. The question table T10 is empty when the presentation is started. When the identification information is sent from the audience terminal 200 with progression of the presentation, the question table T10 sequentially updates the number of the identification information stored and counted by the identification information storing section 102A and the identification information counting section 102B. The question table T10 is displayed by the display section 107 to be described.

Figure 3:
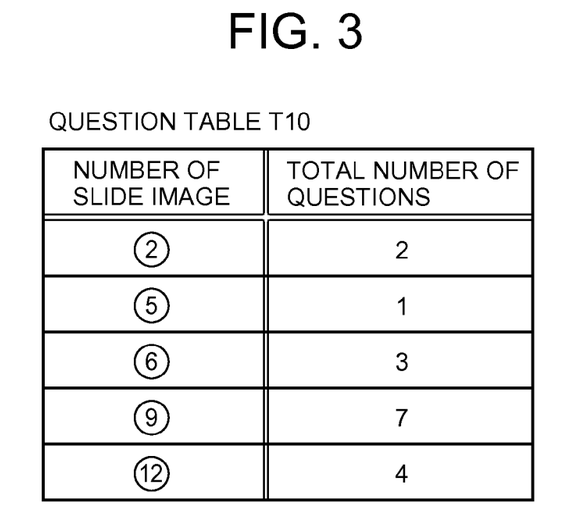
FIG. 3 is a conceptual diagram illustrating a question table T10 according to the embodiment.

FIG. 3 illustrates the question table T10 updated while displaying a slide image 12 in a presentation using the presentation system according to the embodiment.

The question table T10 shown in FIG. 3 indicates two questions are coming for a slide image 2, one question is coming for a slide image 5, three questions are coming for a slide image 6, seven questions are coming for a slide image 9 and four questions are coming for a currently displayed slide image 12. In the other hands, the question table T10 indicates no question is coming for a slide image 1, 3, 4, 7, 8, 10 and 11. The presenter can advance the presentation while checking the number of the identification information which means a number of questions by displaying the question table T10 on the display section 107 to be described.

The audio processing section 105 performs a process to reproduce an audio data and output the audio data as an audio signal according to an instruction from the control section 102. And the audio processing section 105 includes a speaker, not shown, which reproduces the audio signal.

The image processing section 106 generates various image data according to an instruction from the control section 102. And the image processing section 106 adds a predetermined synchronization signal into the generated image data and outputs it as a video signal to the display section 107 and the audience terminal 200 to be described via the wireless communication section 101.

The display section 107 has a display comprising, for example, liquid crystal display which displays an image corresponding to the video signal from the image processing section 106. The DVD/CD-ROM drive 108 drives a DIM/CD-ROM set in the presenter terminal 100 and transmits a program or data stored in the DVD/CD-ROM to the RAM 104 via the bus 110 according to an instruction from the control section 102. The interface 109 connects a keyboard 112 and mouse 113. The interface 109 controls a communication among the keyboard 112, the mouse 113, the control section 102 and the RAM 104. The HDD 103 stores various program including a program indicated by a flow chart to be described and various data. Then, the image processing section 106 adjusts a slide image signal when the slide image signal read out from the HDD 103 is transmitted based on an instruction of the control section 102. The adjusted slide image signal is transmitted from the wireless communication section 101 to the each audience terminal 200 via the wireless communication processing section 111.

Figure 4:
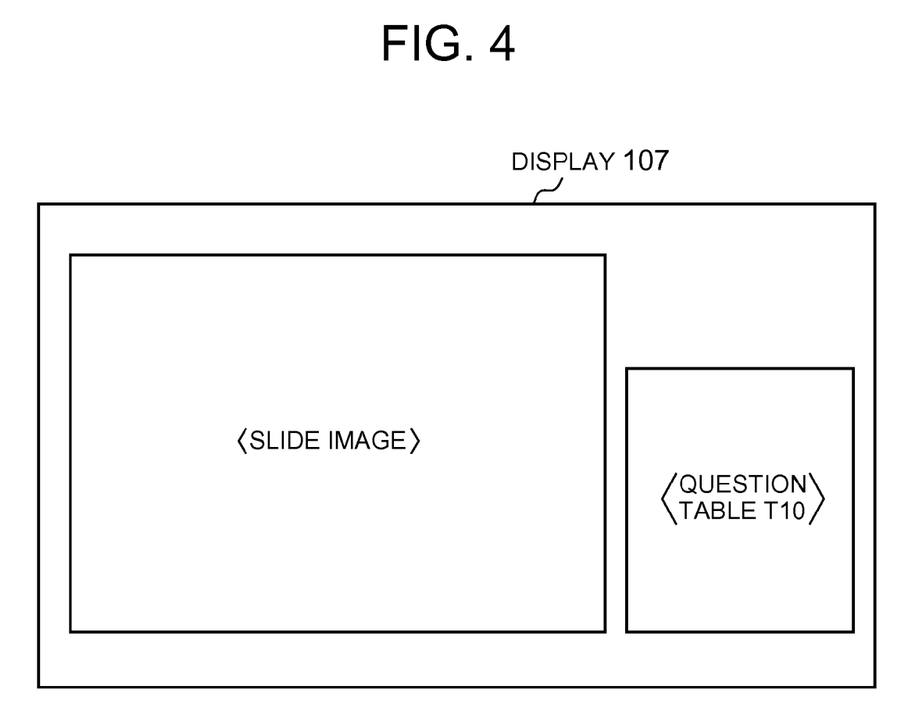
FIG. 4 is a conceptual diagram illustrating an image displayed by a presenter terminal 100 according to the embodiment.

Furthermore, the image processing section 106 adjusts and transmits an image signal to the display section 107 so as to display the slide image and the question table T10 together transmitted from RAM 104 on the display section 107. Specifically, as shown in FIG. 4, the image processing section 106 generates and transmits to the display section 107 an image signal whose size is adjusted so as to display the slide image and the question table T10 together without overlaps each other. At this time, as shown in FIG. 4, the slide image and the question table T10 are adjusted so that they may become a maximum size without overlap on the display 107 based on a predetermined aspect ratio.

That is, when an image signal of the table T10 has been generated, as shown in FIG. 4, the image processing section 106 adjusts the image signal of the table T10 and the slide image as described above.

Figure 5:
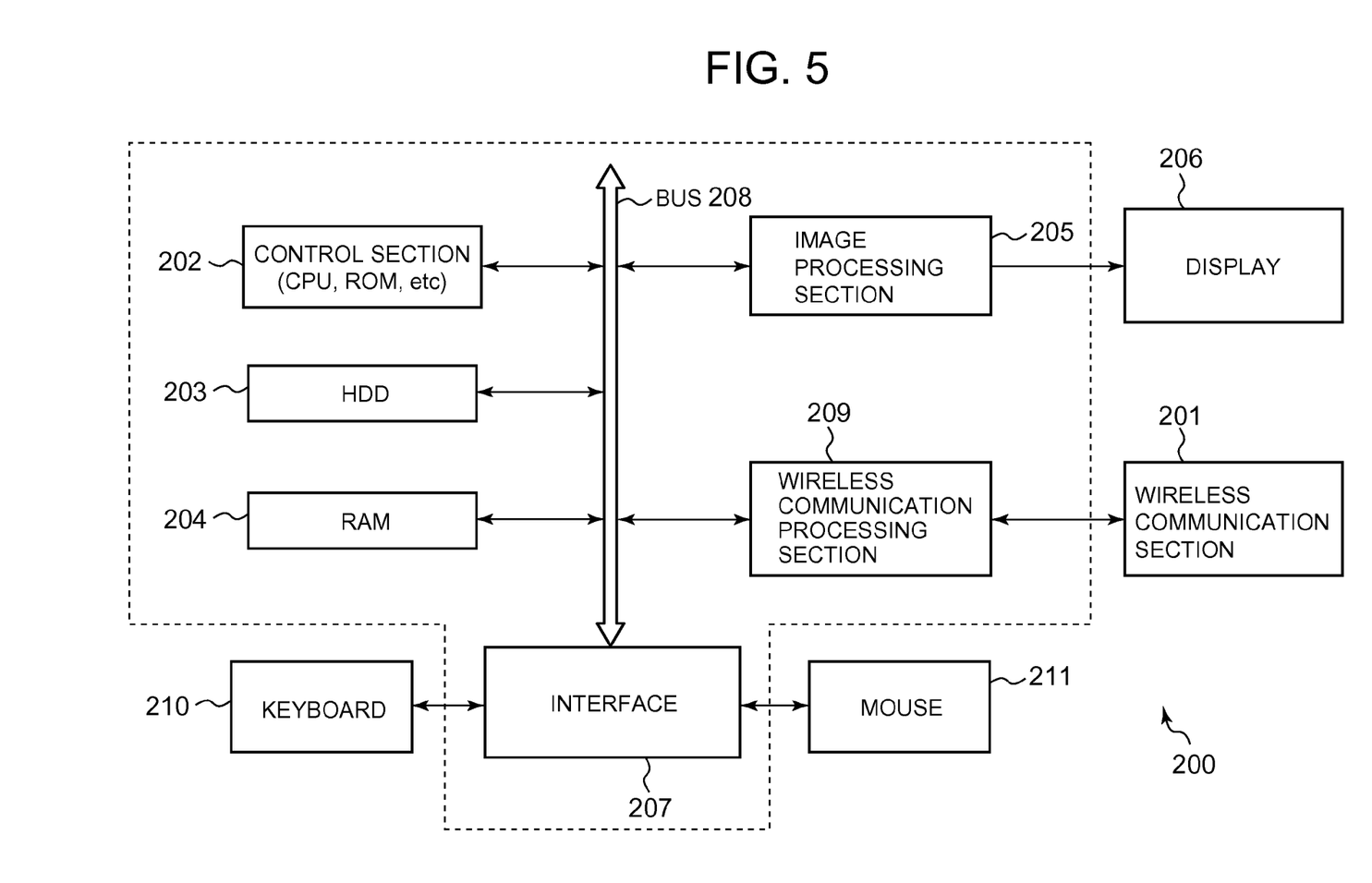
FIG. 5 is a block diagram illustrating the overall configuration of the function of a circuit provided for an audience terminal 200 according to the embodiment.

FIG. 5 is a block diagram illustrating the overall configuration of the function of a circuit provided for an audience terminal 200 according to the embodiment. As shown in FIG. 5, the audience terminal 200 comprises a wireless communication section 201, a control section 202, a HDD (Hard Disk) 203, a RAM (Random Access Memory) 204, an audio processing section 205, a display section 206 and an interface 207 via a bus 208.

The control section 202 comprises a CPU (Central Processing Unit) and a ROM (Read Only Memory) and operates sequentially a program stored in the RAM 204 based on a basic program comprising a boot program or OS (Operating System) stored in the ROM. Indeed the control section 202 controls each section of the audience terminal 200.

The HDD (Hard Disk) 203 stores the slide image which is transmitted from external via the wireless communication section 201.

The RAM 204 is used as a main memory or working area and stores its own identification information, various program and data. The identification information comprises unique number identifying the audience terminal or a pre-entered name of audience. The wireless communication section 201 is connected to a wireless communication processing section 209. A wireless signal from the presenter terminal 100 is received by the wireless communication section 201 and demodulated by the wireless communication processing section 209 and transmitted to the control section 202. And a wireless signal transmitted to the presenter terminal 100 is demodulated by the wireless communication processing section 209 and transmitted from the wireless communication section 201.

The image processing section 205 generates various image data according to an instruction from the control section 202. And the image processing section 206 adds a predetermined synchronization signal into the generated image data and outputs it as a video signal to the display section 206.

Figure 6:
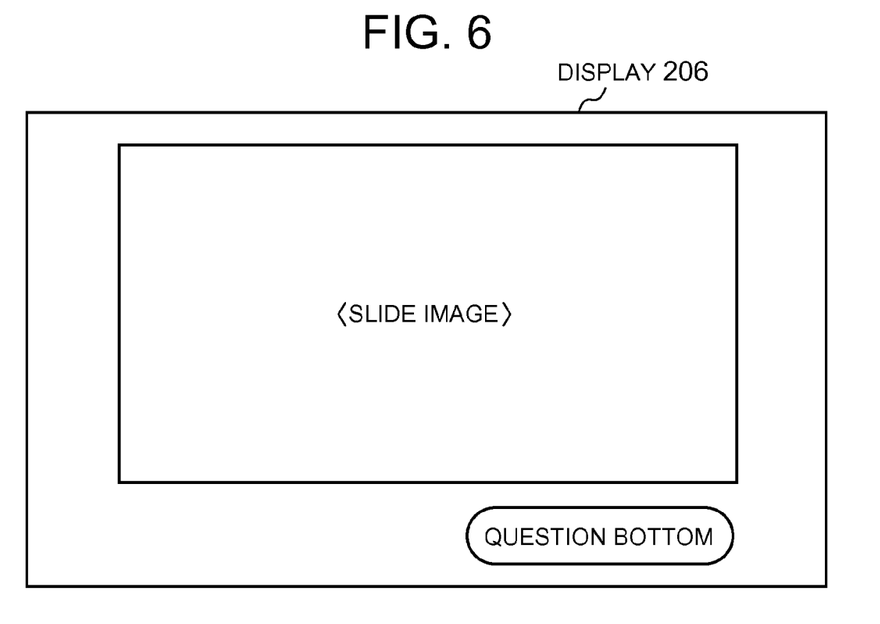
FIG. 6 is a conceptual diagram illustrating an image displayed by an audience terminal 200 according to the embodiment.

Specifically, the image processing section 205 generates an image signal of the slide image received via the wireless communication section 201 and stored in the HDD 203 so as to dispose a question button at a predetermined area as shown FIG. 6. The interface 207 connects a keyboard 210 and mouse 211. The interface 207 controls a communication among the keyboard 210, the mouse 211, the control section 202 and the RAM 204. The HDD 203 stores various program including a program indicated by a flow chart to be described and various data. The display section 206 has a display comprising, for example, liquid crystal display which displays an image corresponding to the video signal from the image processing section 205.

As described above, the control section 102 of the presenter terminal 100 reads out the slide image used for the presentation from the HDD 103 in response to the presenter's operation and transmits the slide image to the display section 107 via the image processing section 106 and the each audience terminal 200 via the wireless communication section 101.

Then, the control section 202 of the audience terminal 200 receives the slide image via the wireless communication section 201, transmits the slide image to the image processing section 205 in order to generate the video signal disposed the question button at the predetermined position, and controls the display section 206 so as to display the slide image disposed the question button.

Therefore, in the embodiment, the audience terminal 200 can display the slide image which is being displayed by the presenter terminal 100 at the same time. The presenter performs the presentation based on the slide image which is being displayed by the presenter terminal 100, the audience takes the presentation with half his eye on the slide image displayed on the display section 206.

Figure 7:
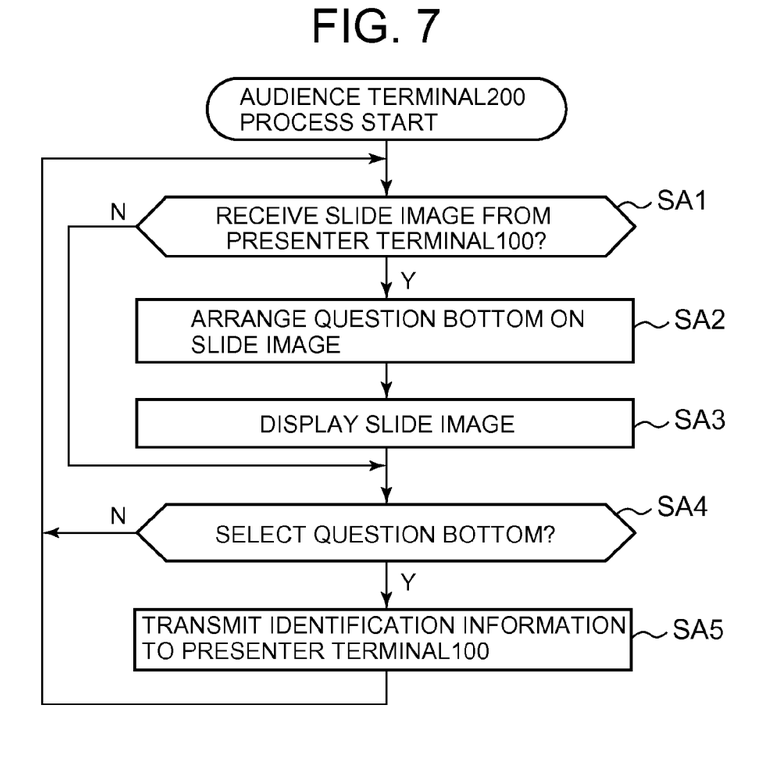
FIG. 7 is a flow chart illustrating the performance of an audience terminal 200 according to the embodiment.

As a flow chart shown in FIG. 7, the control section 202 of the audience terminal 200 in the embodiment performs the below process based on a program stored in the RAM 204. First, the control section 202 monitors whether or not a slide image signal has been transmitted from the presenter terminal 100 (Step SA1). When a slide image signal has been transmitted (YES at Step SA1), the control section 202 transmits the slide image signal to the image processing section 205 and controls the image processing section 205 to generate a slide image which is disposed the question button with the slide image (Step SA2). Then, the control section 202 transmits the generated slide image to the display section 206 to display (Step SA3).

Therefore, as shown FIG. 6, the slide image which is being displayed by the audience terminal 200 is disposed the question button on the bottom-right corner. Next, the control section 202 monitors whether or not an audience selects the question button during the presentation (Step SA4). When the question button has been selected (YES at Step SA4), the control section 202 reads out an its own identification information from the RAM 204 and transmits the identification information to the presenter terminal 100 via the wireless communication section 201 (Step SA5).

Namely, the audience can communicate an intention of the question easily so that it will not slow down a process of the presentation by only selecting the question button disposed on the slide image.

On the other hand, when the slide image signal has not been transmitted at Step SA1 (NO at Step SA1), the control section 202 judges whether or not the question button has been selected at Step SA4. When the question button has not been selected (NO at Step SA4), the control section 202 monitors again whether or not a slide image signal has been transmitted at Step SA1. That is, the control section 202 always monitors whether or not the question button has been selected regardless of a judgment at Step SA1 during the presentation. As described above, the audience can communicate own intention of the question to the presenter by selecting the question button at any timing.

Figure 8:
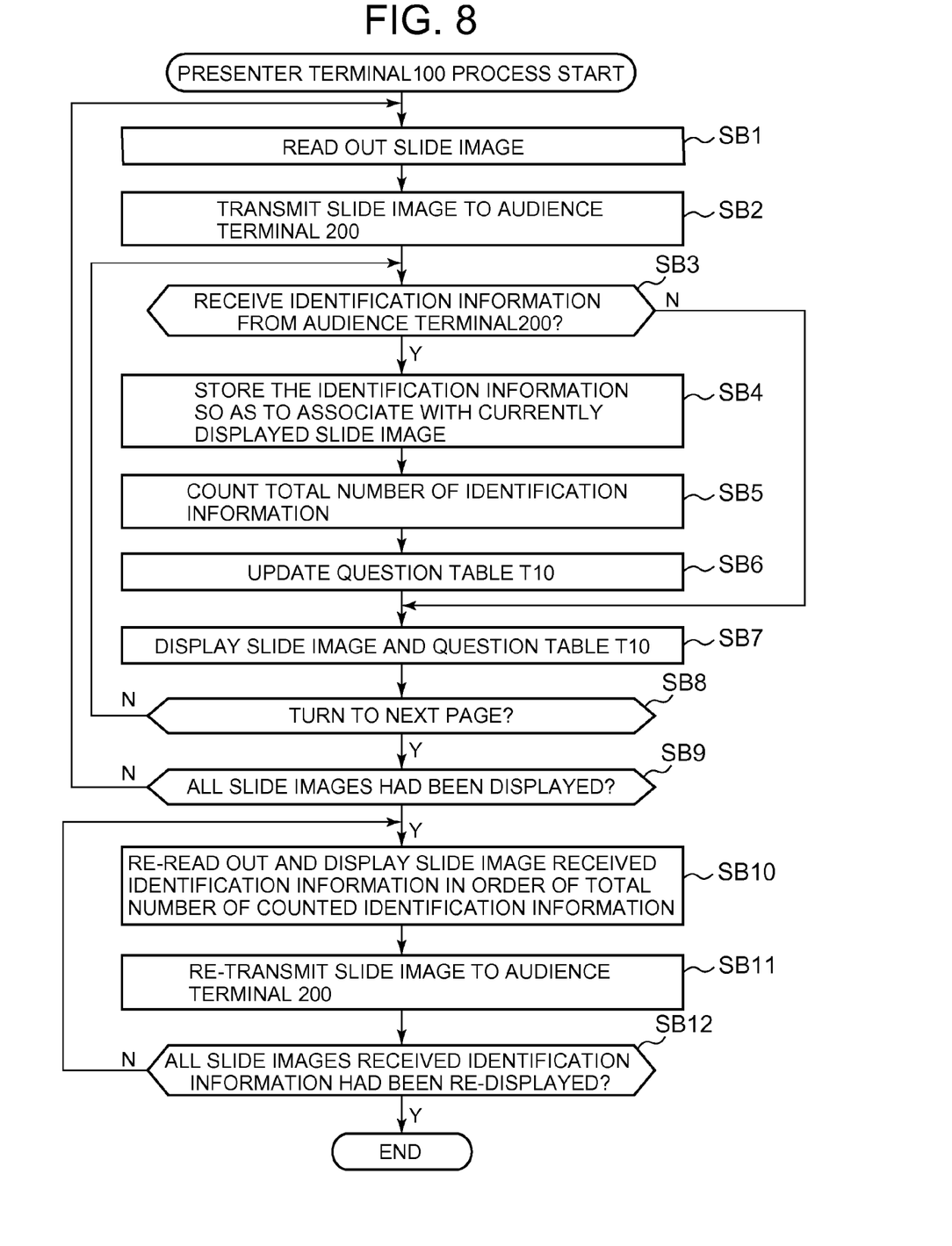
FIG. 8 is a flow chart illustrating the performance of a presenter terminal 100 according to the embodiment.

As a flow chart shown in FIG. 8, the control section 102 of the presenter terminal 100 in the embodiment performs the below process based on a program stored in the ROM. First, the control section 102 reads out the slide image used for the presentation (Step SB1). And the control section 102 transmits simultaneously the slide image to the each audience terminal 200 (Step SB2). Next, the control section 102 monitors whether or not the identification information transmitted from the audience terminal 200 has been received (Step SB3). When the identification information has been received (YES at Step SB3), the control section 102 stores the identification information in association with a currently displayed slide image in the RAM 104 by the identification information storing section 102A described above (Step SB4). Then, the control section 102 counts the identification information transmitted from the audience terminal 200 for each slide image by the identification information counting section 102B (Step SB5) and updates the question table T10 stored in the RAM 104 (Step SB6).

Furthermore, the control section 102 controls the image processing section 106 to adjust an image signal so that the slide image and question table T10 are displayed together by the display 107 as described FIG. 4 (Step SB7). On the other hand, when the identification information has not been received at Step SB3 (NO at Step SB3), the control section 102 displays the slide image and question table T10 which has not been updated together.

Therefore, the question table T10 is in blank until the identification information is transmitted from the audience terminal 200. When the identification information is transmitted from the audience terminal 200 with procession of the presentation, the control section 102 updates the total number of counted identification information and the associated slide image information included in the question table T10 and display the updated question table T10 with the slide image by display 107.

Next, the control section 102 monitors whether or not a slide image turning operation has been performed (Step SB8). When the slide image turning operation has not been performed (NO at Step SB8), the control section 102 monitors again whether or not the identification information has been transmitted from the audience terminal 200 at Step SB3. When the slide image turning operation has been performed (YES at Step SB8), the control section 102 judges whether or not all slide images has been displayed (Step SB9). When all slide images has not been displayed (NO at Step SB9), the control section 102 reads out a next slide image at Step SB1 and performs the following process described above.

Therefore, the presenter can perform the presentation while watching the slide image and the question table T10 displayed on the display 107. When the identification information has been received from the audience terminal 200, the presenter can comprehend immediately a status of the questions by updating the total number of the identification information displayed on the question table T10 on a real-time basis. As a result, the presenter can give a follow up explanation for a slide image which has many questions and adjust allocation of time in the question-and-answer session according to the total number of the questions. In this manner, the presenter can make adaptable correspondence for the question-and-answer session during the presentation.

Figure 9:
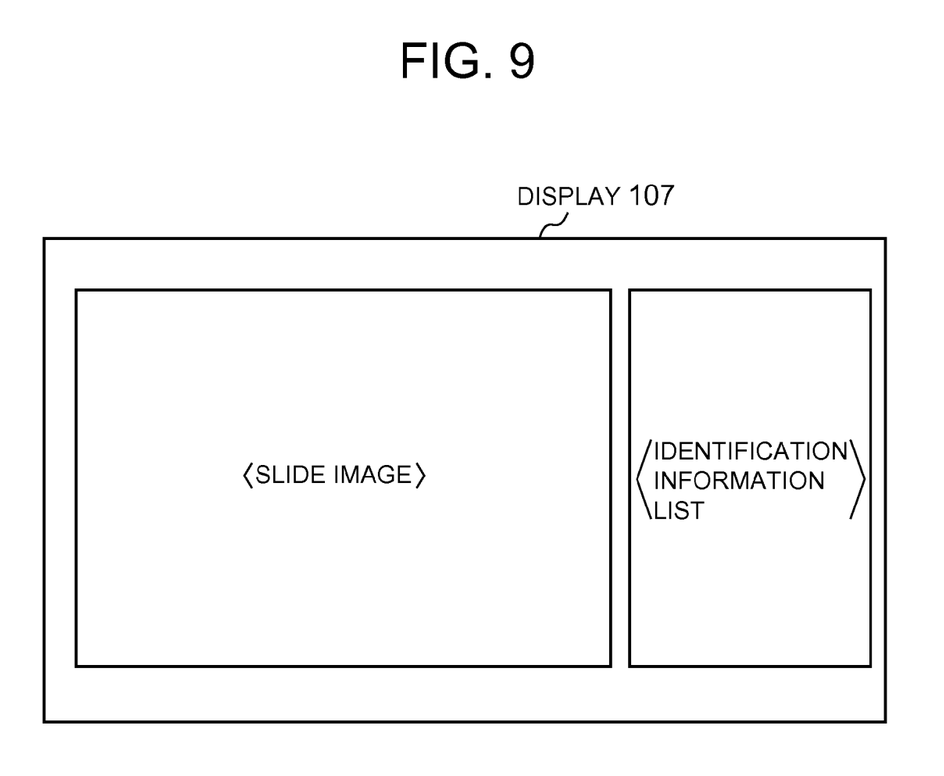
FIG. 9 is a conceptual diagram illustrating an image displayed by a presenter terminal 100 when a question-and-answer session is performing according to the embodiment.

When all slide images has been displayed (YES at Step SB9), the control section 102 performs the question-and-answer session. Namely, the control section 102 reads out and display the slide image sequentially in order of the number of the identification information for the each slide image counted at Step SB5 (Step SB10). As the question table T10 described in FIG. 3, the slide image which has been displayed previously is re-displayed in order of the slide image 7 which has a highest number of the questions, the slide image 12, the slide image 6, the slide image 2, and the slide image 5. And as shown in FIG. 9, the control section 102 displays the identification information comprising an ID number of the audience terminal or audience's name. Therefore, the presenter can find out the slide image corresponding to the questions easily and specify an audience who has been questioned. Thus, the presenter can provide the question-and-answer session smoothly.

The control section 102 retransmits the slide image read out for the question-and-answer session to the audience terminal 200 (Step SB11). The audience can look the slide image corresponding to the questions by the audience terminal 200. Then, the control section 102 redisplays the previously displayed slide image sequentially in order of the number of the received identification information in response to a slide image turning operation by the presenter in the question-and-answer session (NO at Step SB12). When all slide images received the identification information has been redisplayed (YES at Step SB12), the presentation including the question-and-answer session ends.

As described above, the presenter can perform adaptable the question-and-answer session based on a status of the questions displayed and updated on the question table T10 in a real-time basis. The presenter can slide the question-and-answer session at an appropriate timing in consideration of a progress status and remaining time of the presentation. Thus, the presentation system according to the embodiment can provide a question-and-answer session that meets an audience need.

In the foregoing embodiment, the present invention can equally be applied that the control section 102 displays the identification information itself stored in the identification information storing section 102A instead of counting the number of the identification information. In this arrangement, the presenter can comprehend a status of the questions in a real-time basis during the presentation.

In the foregoing embodiment, the present invention can equally be applied that the control section 102 stores and redisplays the previous and next slide image of the slide image in association with the identification information instead of storing the only associated slide image with the identification information.

In the foregoing embodiment, a description has been given that the audience transmits only its own identification information by operating the audience terminal 200. However, the present invention is not limited to this but can equally be applied that the control section 202 transmits the content of question inputted by the keyboard 210, etc. As a result, the presenter can comprehend the content of question, and the audience can avoid forgetting the content of question at the question-and-answer session.

In the foregoing embodiment, the present invention can equally be applied that the control section 102 updates and displays the question table T10 except for first and last slide image. Because first and last slide image usually does not relate with the content of presentation.

In the foregoing embodiment, the present invention can equally be applied that the control section 102 counts all identification information which has been received from the audience terminal 200 for all slide images. Consequently, the presenter can advance the presentation based on total number of the identification information for all slide images.

In addition, the present invention can equally be applied that the control section 102 set previously amount of time required for one question. As a result, the presenter can advance the presentation including the question-and-answer session based on total amount of time required for all questions.

And, the present invention can equally be applied that the audience can select a priority of question. The presenter can advance the question-and-answer session based on the priority of question.

And, the present invention can equally be applied that the audience terminal 200 can transmit a signal which cancels the previously transmitted identification information to the presenter terminal 100.

And, the present invention can equally be applied that audience from a long distance can attend this presentation system because of a wireless communication connection. And, the present invention can equally be applied that the presenter terminal 100 transmits the question table T10 to the audience terminal 200 to be displayed.

Figure 10:
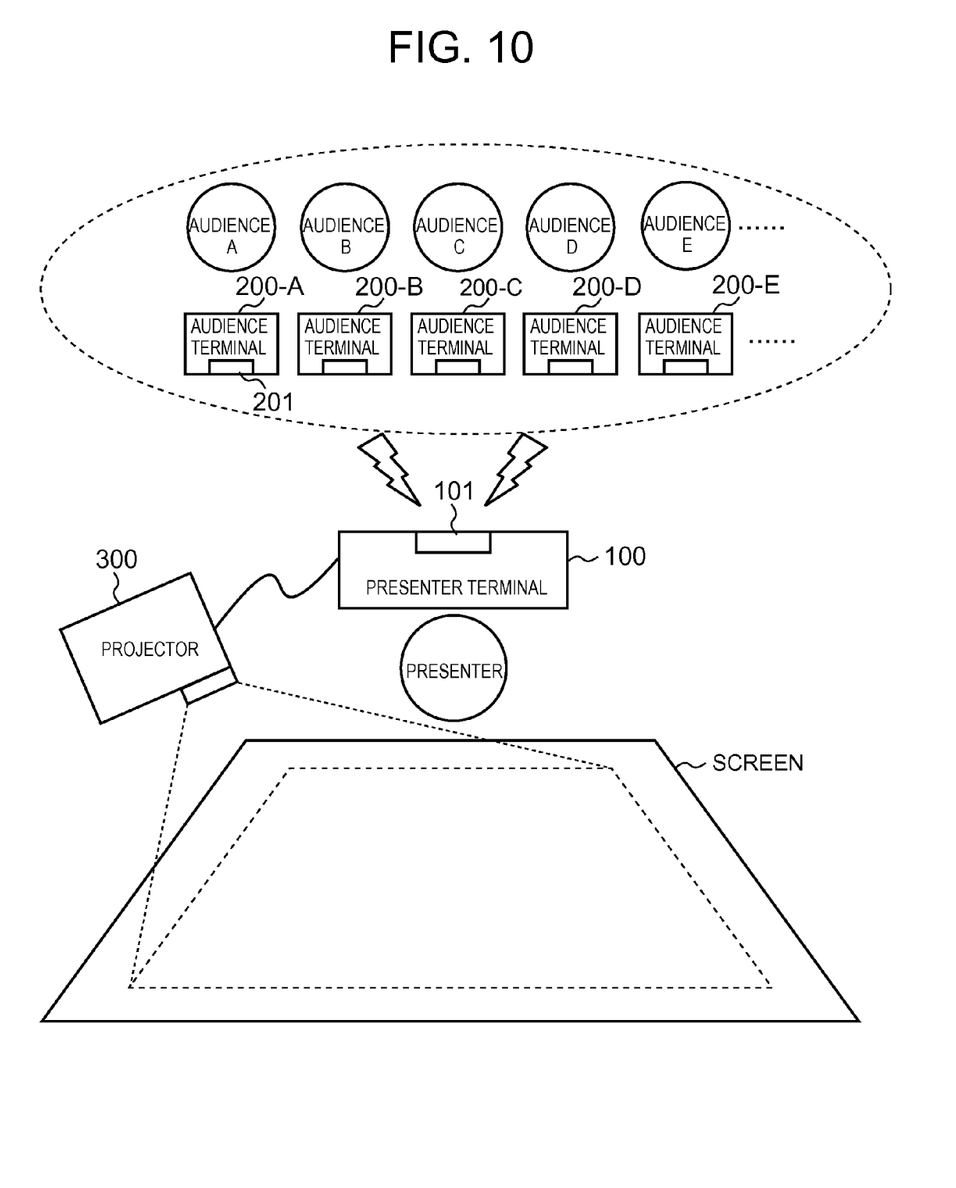
FIG. 10 is a conceptual diagram illustrating the overall configuration of a presentation system according to the another embodiment.

And, the present invention can equally be applied that a projector 300 is connected to the presenter terminal 100 as shown FIG. 10. In this embodiment, the presenter terminal 100 can share a slide image by projecting slide image on a wall. As a result, the audience terminal 200 can comprise without the display section 206.

For example, even when some of the constituent elements of the configurations of the embodiments described above are omitted, this modified configuration is included in the present invention as long as the same effect can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A presentation system comprising:
   a presenter terminal; and
   a plurality of audience terminals which are communicatively connected to the presenter terminal;
   wherein each of the audience terminals comprises:
      an identification information transmitting section which transmits identification information of the audience terminal to the presenter terminal; and
   wherein the presenter terminal comprises:
      a display section which sequentially displays a plurality of images which are used for a presentation;
      an identification information storing section which, for each one of a sequentially-displayed series of the images used for the presentation, stores the identification information transmitted by the identification information transmitting section of the audience terminals during display of the image by the display section, such that the identification information is stored in association with the displayed image; and
      an identification information counting section which, for each one of the series of the images, counts a number of times that the identification information is transmitted by the audience terminals during display of the image by the display section;
      wherein, for each one of the series of the images, the identification information counting section stores, in a table, the counted number for the image in association with identification information of the image; and
      wherein information of the table is simultaneously displayed on the display section of the presenter terminal together with at least one of the images used for the presentation.

2. The presentation system according to claim 1, wherein the presenter terminal further comprises an identification information display controlling section which controls the display section to redisplay a previously displayed image based on the number counted for each one of the series of the images.

3. The presentation system according to claim 2, wherein the identification information display controlling section controls the display section to redisplay a plurality of previously displayed images in descending order of the number counted for each one of the series of the images.

4. The presentation system according to claim 1, wherein the presenter terminal further comprises an image transmitting section which transmits the plurality of images used for the presentation to the audience terminals.

5. The presentation system according to claim 4, wherein each of the audience terminals comprises a second display which displays each of the images transmitted by the image transmitting section at a same time that the image is displayed by the display section of the presenter terminal.

6. The presentation system according to claim 1, wherein the presenter terminal comprises a personal computer.

7. The presentation system according to claim 1, wherein the identification information counting section sequentially updates the table with the counted number for an image currently being displayed, as each one of the series of the images is sequentially displayed.

8. The presentation system according to claim 1, wherein the identification information transmitting section of each of the audience terminals is configured to transmit content inputted by a user in addition to the identification information.

9. The presentation system according to claim 1, wherein the identification information transmitting section of each of the audience terminals is configured to transmit priority information in addition to the identification information, to mark the identification information as high priority.

10. The presentation system according to claim 1, wherein the presenter terminal further comprises a time setting section which sets a time, based on a preset time per identification information, and a total number of times that the identification information is transmitted by the audience terminals during display of all of the images of the series of images.

11. A display apparatus for a presentation system comprising the display apparatus and a plurality of audience terminals which are communicatively connected to the display apparatus, the display apparatus comprising:
   a display section which sequentially displays a plurality of images which are used for a presentation;
   an identification information receiving section which receives identification information transmitted from the audience terminals;
   an identification information storing section which, for each one of a sequentially-displayed series of the images used for the presentation, stores the identification information received by the identification information receiving section from the audience terminals during display of the image by the display section, such that the identification information is stored in association with the displayed image; and
   an identification information counting section which, for each one of the series of the images, counts a number of times that the identification information is received by the identification information receiving section from the audience terminals during display of the image by the display section;
   wherein, for each one of the series of the images, the identification information counting section stores, in a table, the counted number for the image in association with identification information of the image; and
   wherein information of the table is simultaneously displayed on the display section of the presenter terminal together with at least one of the images used for the presentation.

12. A presentation system comprising:
   a presenter terminal;
   a plurality of audience terminals which are communicatively connected to the presenter terminal; and
   a projector which projects an image transmitted by the presenter terminal;
   wherein each of the audience terminals comprises:
      an identification information transmitting section which transmits identification information of the audience terminal to the presenter terminal; and
   wherein the presenter terminal comprises;

an image transmitting section which transmits a plurality of images which are used for a presentation to the projector;

an identification information storing section which, for each one of a sequentially displayed series of the images used for the presentation and projected by the projector, stores the identification information transmitted by the identification information transmitting section of the audience terminals during projection of the image by the projector, such that the identification information is stored in association with the projected image; and an identification information counting section which, for each one of the series of the images, counts a number of times that the identification information is transmitted by the audience terminals during display of the image by the display section;

wherein, for each one of the series of the images, the identification information counting section stores, in a table, the counted number for the image in association with identification information of the image; and wherein information of the table is simultaneously displayed on the display section of the presenter terminal together with at least one of the images used for the presentation.

* * * * *